United States Patent Office 3,763,177
Patented Oct. 2, 1973

3,763,177
BI-2-OXAZOLINE AND OXAZINE COMPOUNDS DERIVED FROM CYANOETHYLATED POLY-(ETHYLENE AND PROPYLENE) GLYCOLS
Donald A. Tomalia and David P. Sheetz, Midland, Mich., assignors to The Dow Chemical Company, Midland, Mich.
No Drawing. Continuation-in-part of abandoned application Ser. No. 835,910, June 16, 1969. This application Mar. 29, 1971, Ser. No. 129,262
Int. Cl. C07d 85/36
U.S. Cl. 260—307 F                                 3 Claims

ABSTRACT OF THE DISCLOSURE

Bi-2-oxazoline and oxazine compositions derived from cyanoethylated poly(ethylene and propylene) glycols and having the formula:

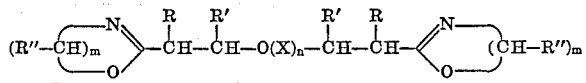

where R, R', and R'' can be H or alkyl containing from 1 to 4 carbon atoms, where X is ($C_2H_4O$) or ($C_3H_6O$), where $n$ is a value from 1 to 50 inclusive and where $m$ is 2 or 3.

This application is a continuatioin-in-part of application, Ser. No. 835,910, filed June 19, 1969, now abandoned.

BACKGROUND OF THE INVENTION

This invention is concerned with novel bi-2-oxazoline and oxazine compositions derived from cyanoethylated poly(ethylene and propylene) glycols, which compositions when reacted with polyepoxides or polysulfhydryl compounds form elastomeric polymers having desirable properties of strength, durability and resistance to tearing. Such bi-2-oxazoline and oxazine compositions can also be cured in the presence of boron trifluoride to provide useful, rigid polymeric materials.

THE PRIOR ART

The polymerization of various monooxazoline compounds is described in U.S. Pat. No. 3,373,194 and also in the Journal of Polymer Science, Volume 4 (part A–I) (1966), page 2253 and following.

DESCRIPTION OF THE PRESENT INVENTION

According to the present invention, cyanoethylated polyethylene glycols and polypropylene glycols are treated with hydrogen chloride and with ethylene chlorohydrin or propylene chlorohydrin to obtain amidate derivatives which are then treated with a cyclizing agent such as triethylamine to obtain a polyethylene glycol or polypropylene glycol doubly terminated with oxazoline or oxazine groups which can be substituted; these oxazine or oxazoline terminated compounds are difunctional monomers adapted to be cured to obtain elastomic polymers.

The doubly nitrile terminated, that is to say, the bis-cyanoalkyl polyglycols utilized can be prepared by combining the polyglycol, in a solvent, such as one which is advantageously at least 30 volume percent liquid paraffinic hydrocarbon, and, in such solvent, combining also an unsaturated nitrile compound such as acrylonitrile, methacrylonitrile, or crotonitrile. The reaction is catalyzed by strong bases, such as alkali metal oxides, hydroxides, alkoxide, hydrides, cyanides, and amides or the alkali metal salts of the polyglycol to be cyanoalkylated; also, the strongly basic quaternary ammonium compounds such as tetramethyl ammonium hydroxide, benzyl trimethyl ammonium hydroxide and the like.

The so formed bis-cyanoalkyl polyglycols are then maintained at temperatures near to the freezing temperature of water and under nitrogen purge and in liquid phase, and reacted with a loweralkylene chlorohydrin and also with hydrogen chloride gas. Desirably, the reacting cyanoethylated loweralkylene glycol is dissolved in liquid solvent and the lower alkylene chlorohydrin, typically, ethylene chlorohydrin, added slowly, portionwise, and with stirring.

After the reactants have been combined, while maintaining nitrogen purge and temperatures near to the freezing temperature of water, an additional time of reaction is provided during which the reaction can go forward to completion. Thereafter, a portion of further solvent can be added and the resulting mixture placed under vacuum to withdraw portions of unconsumed hydrogen chloride. After an hour or so under partial vacuum, an additional portion of solvent can be added and the resulting mixture warmed to room temperature or somewhat above, such as to 35–45° and the subatmospheric pressure maintained for an additional period of time to withdraw further portions of hydrogen chloride.

Following the vaporization and removal of unconsumed hydrogen chloride, the mixture is ready to be cyclized.

In cyclizing the terminal reaction product moieties present, the reaction mixture is cooled to a temperature near to the freezing temperature of water; and a cyclizing agent, which must be an agent for the acceptance of the elements of hydrogen chloride, is added slowly, portionwise, and with stirring over a period of time. Advantageously, during this combining process, chilling also is continued.

Upon the completion of the addtion of cyclizing agent, the resulting mixture is then heated at a reaction temperature which can be from room temperature to approximately 50° for a reaction period of time such as from one to eight hours, to carry to completion the cyclizing reaction and thereafter, the resulting mixture cooled to room temperature and poured into water. While the phase separation effected by water dispersion is not perfect or complete, it is a useful and convenient method of working up the desired product. In general, the hydrochloride of reaction, such as an amine hydrochloride, is water soluble and is removed and discarded in water phase; in general, the desired bisoxazine or oxazoline product is much less water soluble and is separated and derived from the organic phaes.

Upon separation of the organic from the aqueous phase, the product can then be distilled, to strip off and remove solvent and volatile substances not desired, and, over a modest and distinct temperature range, depending upon the distribution of polymeric species of the starting polyloweralkylene glycol, one obtains, in satisfactorily high purity, the bisoxazine or oxazoline polyloweralkylene glycol derivative of the present invention.

Identity of the product is readily checked by infrared spectrum which may be scrutinized for the inflection representing the stretching mode of the moiety —C=N— located at approximately 1673 reciprocal centimeters but subject to modest variation depending upon adjacent groups, as is known in the infrared art. Also, elemental analysis can be relied upon and should be accurate to a close approximation; the interpretation of elemental analysis may be facilitated by comparison with elemental analysis of the polyloweralkylene glycol starting material.

The resulting materials, under ordinary chemical storage conditions, are stable and can be held in storage until desired.

When it is desired to cure the difunctional polymers according to the present invention to obtain elastomeric high-polymer products, the difunctional monomer of the present invention is mixed and stirred into a curable polyepoxide and thereafter cured in known manner; or is mixed and combined with a polysulfhydryl compound and the resulting mixture subjected to known curing catalysis and similar influences; or the resulting polyfunctional monomer is mixed with a monooxazoline or oxazine compound together with catalyst such as for example, boron trifluoride or a complex of boron trifluoride in catalytic amount and thereafter heated to obtain a polymeric material. The homopolymers are prepared under similar catalysis.

The polyepoxide is any curable polyepoxide of the general formula

e.g. those having an average of more than one 1,2-epoxy aliphatic groups, average. A representative material is the diglycidyl ether of bisphenol A or bisphenol F; similarly, the condensation products of such glycidyl ethers with further bisphenol further epoxylated by reaction with further portions of epichlorohydrin are usefully employed. Also, the polyepoxides of polyloweralkylene glycols are usefully employed. Similarly, epoxylated novolak compounds are employed when desired, and also polyepoxide compounds derived from the epoxylation of uncharacterized and incompletely identified polyhydroxy-aromatic side products from industrial processes. When it is desired to obtain a cured epoxy resin of low flammability or substantially fireproof, a starting material of choice will comprise, or may entirely consist of, a partially to completely brominated polyepoxide starting material. While brominated starting materials are usually the fire-retardant materials of choice, giving rise to partially brominated cured epoxy resins, materials otherwise halogenated are also used when desired.

The polysulfhydryl compound which can be used is any such compound having the general structure

such as, for example, 1,4-dimercaptobenzene or the like.

The following examples illustrate the best methods known of practicing the present invention.

Example 1.—Preparation of 2,2′-propylenebis (oxyethylene)bis-2-oxazoline

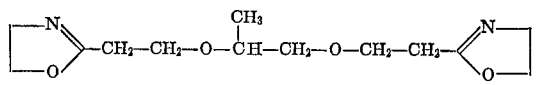

Into a flask was placed 91 grams, 0.5 mole, of 3,3′-(propylenedioxy)dipropionitrile together with 80.5 grams, 1.0 mole, ethylene chlorohydrin, dissolved together in 100 milliliters methylene chloride. Temperature of the solution was lowered to 0 to 5° C.; and at this temperature, with continued stirring, hydrogen chloride gas, 111 grams, was introduced into the stirred reactants and below the surface of them through a sparger.

Upon the completion of the addition of hydrogen chloride gas, stirring was continued and the resulting solution was then purged with nitrogen gas which was passed in through a sparger for one hour; and the mixture was thus thereafter maintained, with continued stirring, at 0 to 5° C. overnight, to carry the reaction to completion.

Thereafter, to remove excess and unreacted hydrogen chloride, the resulting solution was diluted with 200 milliliters dichloromethane, and the resulting solution placed under vacuum of approximately 20 to 30 millimeters mercury absolute for about an hour. At the end of this time, a further 100 milliliter portion of dichloromethane was added whereupon the entire solution was warmed to approximately 35° C., while being maintained under the indicated subatmospheric pressure for approximately an additional hour.

Thereafter, the resulting reaction solution was chilled to 0 to 5° C., and thereinto, dropwise, and with continuous stirring during a period of about an hour, triethylamine in the amount of 222 grams, 2.2 gram moles, was introduced. The resulting mixture was then heated at 35–40° for four hours, cooled to room temperature, and poured into 750 milliliters of water.

In general, the desired product segregated as a relatively insoluble organic layer whereas by products of reaction including triethylamine hydrochloride segregated in an aqueous layer. The organic layer was separated, and from it solvent was removed, to obtain 107.7 grams (80 percent by weight of starting dipropionitrile compound) of crude product. Most of the loss is believed to have occurred through partial solubility of product in water.

The crude product was placed in a high vacuum still, and carefully distilled to obtain 79 grams (yield of 59 percent by weight of starting dipropionitrile) of a pale yellow liquid boiling at 100–102° C. under a pressure of $1.5 \times 10^{-4}$ millimeters mercury, absolute.

Upon completion of the high vacuum distillation, the product was scrutinized by infrared spectrum, and found to exhibit, among other expected features, a sharp absorption maximum at 1673 reciprocal centimeters, indicative of the 2-oxazoline structure. A sample of the product was analyzed for carbon, hydrogen, and nitrogen and found to contain 57.9, 8.58 and 10.2 weight percent by total weight of sample of these elements, as compared with theoretical values of 57.8, 8.15, and 10.3 percent respectively.

A mixture of equimolecular amounts of 2,2′-propylene bis(oxyethylene) bis(2-oxazoline) and 2,2-bis(p-(2,3-epoxypropoxy)phenyl) propane was intimately mixed and stirred to obtain a substantially colorless, mobile, homogeneous solution of viscosity substantially lower than that of the starting epoxypropoxyphenyl propane compound.

The resulting solution was divided, again, into samples designated as A, B, and C and each was maintained in a small, open, aluminum tray. Sample A, allowed to stand at room temperature (approximately 25° C.) for one month showed substantially no change. The sample remained a colorless, mobile liquid of low viscosity. Sample B was heated for four hours at 250° F. in an open tray whereas Sample C was heated for ten hous at 350° F. also in an open tray. After such heating, Sample B was somewhat susceptible of solvent deterioration and was in the form of a light yellow, tough resin. After heating, Sample C was a thin plate or chip of a brown, tough, horny resin upon which prolonged soaking in acetone, water, or benzene had no visible effect.

EXAMPLE 2

Preparation of 2,2′-ethylenebis(oxyethylene) bis-2-oxazoline

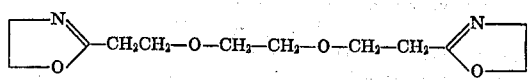

The compound prepared according to the instant example is an immediate lower homologue of the compound of Example 1.

A solution was prepared, consisting of 84 grams, 0.5 gram-mole, of 3,3′-(ethylenedioxy)dipropionitrile and 80.5 grams, 1 gram mole, of ethylene chlorohydrin, both dissolved together in 100 milliliters of dichloromethane, at 0–5° C. At this temperature, and with continuous stirring, hydrogen chloride gas (75 grams, total) was introduced by a sparger beneath the surface of the pool of flask contents.

Upon completion of the introduction of hydrogen chloride gas, stirring was continued, and the resulting solution was purged with nitrogen introduced through a sparger for one hour, and thereafter placed and maintained at a temperature of 0.5° C. with continued stirring, overnight, to carry the reaction to completion.

The next morning, approximately 15 hours after the product was set to undergo prolonged reaction, 200 milliliters dichloromethane was added, and the reaction mixture then placed under subatmospheric pressure of approximately 20–30 millimeters mercury, absolute for an hour to remove excess hydrogen chloride. Thereafter, 100 milliliters further of dichloromethane was added, and the resulting solution was warmed at 35° C. while under indicated subatmospheric pressure for an hour further.

It has been noted, supra, that the cyclizing agents to be employed according to the preent invention are acceptors for hydrogen halide. It follows that, in any embodiment of this invention, not only the present example, that any excess hydrogen chloride, if no vacuum removal is attempted, or remaining after vacuum removal, is promptly accepted and bound in readily removable form by the cyclizing agent. Therefor, the indicated vacuum removal of excess hydrogen chloride, while highly desirable from the standpoint of economy of cyclizing agent, is not critical to the practice of the present invention, but is, rather, a matter of convenience and economy.

The reaction mixture, after such vacuum removal of hydrogen chloride in excess, was then cooled to 0 to 5° C., and 222 grams, 2.2 gram moles, triethylamine was added dropwise, and over a period of one hour. The resulting mixture was then heated, with continued stirring, at 35–40° C., for four hours, whereupon it was cooled to room temperature and thereafter poured into 750 milliliters water. In general, the triethylamine hydrochloride of reaction segregated into the water layer, while desired product segregated into a separate organic layer, although the product was to some slight extent soluble in the aqueous phase and portions were thereby lost. The aqueous layer was separated, and concentrated by vapor removal of solvent, to obtain 78.2 grams (61 percent) of crude product as a light yellow liquid. The resulting crude product was distilled in a high vacuum still to obtain a major fraction boiling at 112–114° C. under a pressure of $2.5 \times 10^{-4}$ millimeters mercury, absolute, which liquid promptly solidified upon cooling to obtain an off-white solid melting at 35–38° C.

The product was scrutinized, and found to manifest an infrared spectrum with a prounounced inflection at 1675 reciprocal centimeters, characteristic of the 2-oxazoline nucleus.

A further portion of the redistilled product was analyzed and found to have contents of carbon, hydrogen, and nitrogen, respectively, of 55.4, 8.12, and 10.7 weight percent by weight of total sample of products as compared with theoretical values of 56.3, 7.80, and 10.9, respectively.

A mixture of equimolecular amounts of 2,2'-ethylene bis(oxyethylene)-bis(2-oxazoline) and 2,2 - bis(p-(2,3-epoxypropoxy)phenyl)propane, presently 1.28 gram of the former (0.05 mole) and 1.9 gram of the latter (also 0.005 mole) were combined to obtain a colorless, mobile, homogeneous viscous, readily pourable, substantially water clear liquid. The liquid is curable with heat to obtain an epoxy resin.

In the instant example the resulting liquid was divided into three approximately equal but unweighed portions, and they were designated as A, B, and C. Portion A was permitted to stand in open air in a small aluminum tray, and was observed during a month. Portion B was heated for four hours at 250° F. (approximately 121° C.) and Portion C was heated for ten hours at 350° F. (approximately 177° C.), each in a small, open aluminum tray. Whereas the sample maintained at room temperature underwent no visible change during a month, the heated samples both became hard. Sample B became a very pale yellow, tough resin which was swellable and susceptible of deterioration in physical form upon being soaked in acetone, water, or benzene. Sample C became brown, tough, and in the thin plate here prepared, was yielding and horny in character. Prolonged soaking in water and benzene were without effect and prolonged soaking in acetone increased the apparent elasticity of the material slightly.

EXAMPLE 3

Bis-2-oxazoline terminated polypropylene glycol, from starting polyglycol of average molecular weight of 400

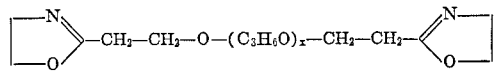

The starting bis(2-cyanoethyl)ether according to the instant invention is the bis(2-cyanoethyl)ether derivative of polyglycol P-400. This polyglycol is a polypropylene glycol which, prior to cyanoethylation, has an average molecular weight of approximately 400, representing approximately 6½ average recurring propylene glycol units.

Of this bis(2-cyanoethyl)ether of polyglycol P-400, 510 grams (1.0 mole) and also 161 grams, 2.0 moles, ethylene chlorohydrin, were dissolved together in 200 milliliters dichloromethane. The resulting solution was cooled to a temperature of 0–5° C. Stirring was begun, and, with continuous stirring, hydrogen chloride gas was introduced thereinto and beneath the surface of the pool of the liquid reaction mixture by sparger until 265 grams had been introduced. The introduction of the gas took approximately four hours.

Following the completion of the introduction of hydrogen chloride, the resulting reaction mixture was maintained at the indicated temperature, and stirring was continued overnight.

Thereafter, a portion of the mixture was further treated to dehydrohalogenate and cyclize as follows. To the portion employed, 400 milliliters dichloromethane was added, after which the resulting solution was maintained, with stirring, for one hour under pressure of approximately 20–30 millimeters mercury, absolute, then heated for one hour at 35–40° C. under atmospheric pressure, and, while the same temperature was maintained, the ambient pressure dropped to again approximately 20–30 millimeters mercury, absolute.

Following this procedure, the resulting mixture was cooled to 0–10°, and, at that temperature, 370 grams, 3.65 gram moles, triethylamine was added, dropwise, over a period of approximately 165 minutes. The mixture was then heated at 45–50° during four hours, then cooled to room temperature, and subsequently poured into 150 milliliters water. The water mixture was stirred, to wash water-soluble components out of the resulting organic product, the organic product permitted to segregate as a separate organic layer which was separated and removed, and from it solvent evaporated to obtain 280 grams of a dark orange syrup. This syrup was freed of volatiles in a high vacuum still at $10^{-4}$ millimeters mercury pressure, absolute.

A sample of the high vacuum distilled product was examined by both nuclear magnetic resonance spectrum and infrared spectrum analysis, and both spectra were found to be consistent with those expected of the bis-2-oxazoline structure. The structure was further confirmed by polymerizing the product in the manners indicated, foregoing, and obtaining polymers entirely consistent with this invention.

EXAMPLE 4

Bis-2-oxazoline terminated polypropylene glycol, from starting polyglycol of average molecular weight of 1200

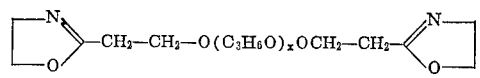

The starting bis(2-cyanoethyl)ether according to the instant invention is the bis(2-cyanoethyl)ether derivative of polyglycol P-1200. This polyglycol is polypropylene glycol which, prior to cyanoethylation, has an average molecular weight of approximately 1200, representing approximately 20 average recurring propylene glycol units.

Of this bis(2-cyanoethyl)ether of polyglycol P-1200, 328 grams, 0.25 gram mole, together with 60 grams, 0.75 gram mole, of ethylene chlorohydrin, was dispersed in 125 millimeters dichloromethane. The resulting solution was cooled to 0–5° C., with stirring, and, at this temperature, during 3.5 hours, hydrogen chloride gas was introduced, by sparger, until 155 grams had been taken up. Introduction of further hydrogen chloride was then terminated, but stirring and cooling were continued at the indicated temperature, overnight, approximately 15 hours. At the conclusion of this interval, 100 milliliters dichloromethane was added and the resulting mixture placed under a pressure of 20–30 millimeters mercury, absolute, for approximately an hour to remove excess hydrogen chloride. Thereafter, the mixture was heated under atmospheric pressure at 35° for an hour, and then held at 35° under pressure of 20–30 millimeters mercury, absolute, for a further hour.

Following the completion of these steps for the removal of excess hydrogen chloride, the reaction mixture was cooled to 0–5° C., and the cyclizing of the amidate hydrochloride was begun. To cyclize, 111 grams (1.1 gram moles) of triethylamine was added, dropwise, and with continuous stirring, over approximately 105 minutes. Following the completion of the addition of the triethylamine, 200 milliliters further dichloromethane was added, and the mixture heated at 45–50° for four hours to carry the reaction to completion. Upon cooling to room temperature, 500 milliliters dichloromethane was added, and, in the resulting essentially organic solvent system, by products tended to settle as particulate solids, forming a slurry. The slurry was filtered, and the residue comprised 208.3 grams triethylamine hydrochloride. From the liquid filtrate, by vaporization and removal of solvent, 241.5 grams of a dark orange product oil were obtained. From a 134.8 gram sample of this oil, volatiles were removed under a pressure of $10^{-4}$ millimeters absolute mercury pressure. The resulting product, also an oil, was examined by nuclear magnetic resonance and infrared spectrum, and the spectra presented, uniformly, the features that were expected of the proposed bis-2-oxazoline polypropylene glycol structure. Further, the product was readily curable in a polymerization reaction with an elastomer consistent with the present invention.

EXAMPLE 5

The present example is carried out in all respects as was Example 3, except that to the bis(2-cyanoethyl)ether of the polyglycol P-400, instead of ethylene chlorohydrin in the amount of two moles, there are added two moles of the mixed isomeric propylene chlorohydrins, namely, 1-chloro-2-propanol and 2-chloro-1-propanol. Except for these substitutions, the substances and relative amounts employed are identical with those of Example 3.

In the resulting cyclized product, 1-chloro-2-propanol gives rise to the 5-methyl-2-oxazolin-2-yl product whereas the 2-chloro-1-propanol product gives rise to a 4-methyl-2-oxazolin-2-yl product. Correspondingly, the product of the present example, following vacuum distillation is a mixture of the two said isomers. It is, similar to those foregoing, useful in the preparation of an elastomeric polymer as indicated.

What is claimed is:

1. A compound of the formula

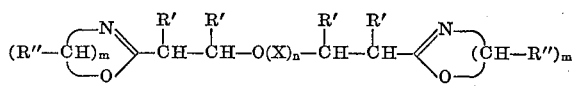

where R, R' and R" can be H or alkyl of 1 to 4 carbon atoms, where X is ($C_2H_4O$) or ($C_3H_6O$), where $n$ is 1 to 50 inclusive and where $m$ is 2 or 3.

2. 2,2'-propylenebis(oxyethylene)bis-2-oxazoline of the formula

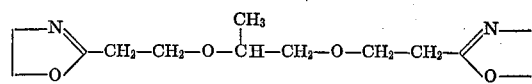

3. 2,2'-ethylenebis(oxyethylene)bis-2-oxazoline of the formula

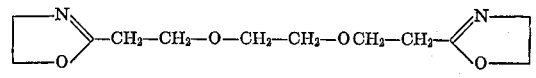

References Cited

UNITED STATES PATENTS 3,563,920    2/1971    Tomalia et al. _____ 260—2

ALEX MAZEL, Primary Examiner

R. V. RUSH, Assistant Examiner

U.S. Cl. X.R.

260—2 N, 47 EN, 59, 246 R

PO-1050
(5/69)

UNITED STATES PATENT OFFICE
CERTIFICATE OF CORRECTION

Patent No. __3,763,177__   Dated __October 2, 1973__

Inventor(s) __Donald A. Tomalia and David P. Sheetz__

It is certified that error appears in the above-identified patent and that said Letters Patent are hereby corrected as shown below:

Column 2, line 45, the word --the-- should be inserted between "in" and "water".

Column 2, line 48, the word "phaes" should be --phase--.

Column 8, line 20 in Claim 1, the prime (') mark should be deleted from the R' the first and fourth time it appears in the formula so that the formula should read as follows:

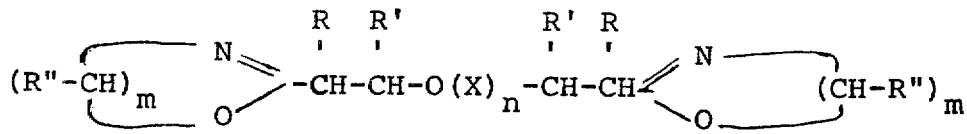

Signed and sealed this 12th day of February 1974.

(SEAL)
Attest:

EDWARD M. FLETCHER, JR.
Attesting Officer

C. MARSHALL DANN
Commissioner of Patents